United States Patent [19]
Wolfer

[11] Patent Number: 4,789,183
[45] Date of Patent: Dec. 6, 1988

[54] METHOD AND APPARATUS FOR RESTRAINING AN INDIVIDUAL

[76] Inventor: Joseph A. Wolfer, 4903 W. Carol Ave., Glendale, Ariz. 86302

[21] Appl. No.: 165,813

[22] Filed: Mar. 9, 1988

[51] Int. Cl.⁴ ............................................. B60R 21/00
[52] U.S. Cl. ....................................... 280/801; 70/16; 297/466
[58] Field of Search ................... 280/801, 808; 70/16; 297/466

[56] References Cited

U.S. PATENT DOCUMENTS

| | | | |
|---|---|---|---|
| 1,823,697 | 9/1931 | Nenstiehl | 70/16 |
| 3,007,331 | 11/1961 | Irwin | 70/16 |
| 4,324,024 | 4/1982 | Friedman | 280/801 |
| 4,537,154 | 8/1985 | Kay | 280/801 |

Primary Examiner—Kenneth R. Rice
Attorney, Agent, or Firm—Nissle & Leeds

[57] ABSTRACT

An improved method and apparatus for restraining an individual seated in a vehicle. The apparatus maintains the handcuffed hands of the individual in position behind the individual's back while he is seated in the vehicle and also prevents the individual from working his hands and the handcuffs underneath his buttocks and legs to the front of the individual's body.

4 Claims, 1 Drawing Sheet

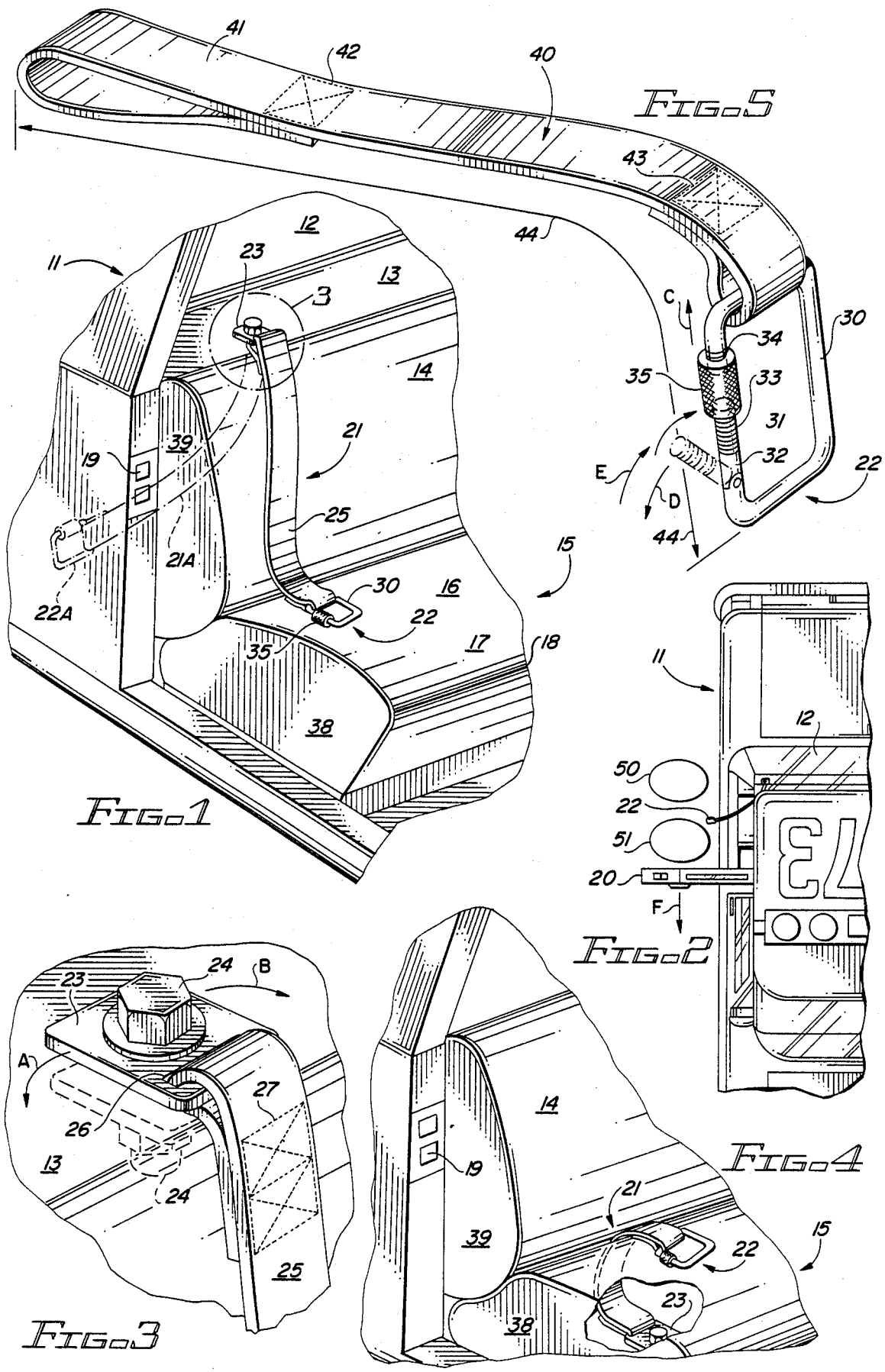

METHOD AND APPARATUS FOR RESTRAINING AN INDIVIDUAL

This invention pertains to apparatus for restraining and controlling the movements of an individual.

More particularly, the invention pertains to a method and apparatus for seating an individual in a vehicle with his wrists handcuffed behind his back, the method preventing the individual from working his hands under his buttocks and legs to the front of his body.

In a further respect, the invention pertains to a method and apparatus for walking an individual to a vehicle and seating the individual in the vehicle, the method and apparatus minimizing the likelihood that the individual can escape from or injure a police officer or other person escorting the individual to the vehicle.

Apparatus for restraining an individual being transported in a vehicle is well known in the art. See, for example, U.S. Pat. Nos. 1,823,697 to Nenstiehl and 3,007,331 to Irwin. Such prior art apparatus has important disadvantages. These disadvantages are probably why such apparatus is apparently not utilized by various law enforcement agencies in the United States. In particular, in the Nenstiehl and Irwin references, the suspect's hands are cuffed in front of the individual. A police officer must put his head, hands and arms inside the vehicle to attach the securing strap or member to the suspect's handcuffs. The officer must do the same when the individual is being removed from the vehicle. When the officer's head, arms and hands are inside the vehicle, the officer is vulnerable to being kicked in the head by the suspect's knees or to being struck by the individual's wrists and handcuffs.

Another disadvantage of conventional handcuffing procedures is that a handcuffed individual is normally walked to the officer's car with the officer behind the individual and holding on to his belt. A suspect can often break the officer's hold on his belt and turn and strike the officer or turn and run from the officer.

Finally, since the apparatus described in the earlier mentioned Irwin and Nenstiehl patents is not utilized in present day police vehicles, suspects are placed in the back seat of the car with their hands cuffed behind the back. After the vehicle door is closed and the officer is driving the vehicle to a desired location, the suspect can sometimes work his hands underneath the buttocks and legs to the front of his body. When the officer opens the door of the vehicle to remove the suspect, the suspect is better able to kick the officer or strike him with his handcuffs.

The importance of the afore-mentioned disadvantages in conventional procedures for securing an individual while in a vehicle and while the individual is walked to the vehicle is demonstrated by the fact that handcuffed suspects have managed to knock police officers down and take their gun, with dire consequences.

Accordingly, it would be highly desirable to provide an improved method and apparatus for walking a handcuffed individual to a vehicle and securing him in the vehicle so the individual cannot work his hands beneath his buttocks and legs to the front of his body.

It would also be highly desirable to provide an improved method and apparatus for walking a handcuffed individual to a vehicle, the method increasing the ability of an officer to control the individual and prevent the individual from escaping or injuring the officer.

Therefore, it is a principal object of the invention to provide an improved method and apparatus for controlling and restraining an individual when the individual is walked to a vehicle and secured therein.

Another object of the instant invention is to provide an improved method and apparatus for controlling an individual which reduces the likelihood a suspect can escape from a police officer, in particular a female officer, while the suspect is being walked to a vehicle.

A further object of the invention is to provide an improved method and apparatus for controlling a handcuffed individual while the individual is escorted by a police officer to a vehicle.

These and other and further and more specific objects and advantages of the invention will be apparent to those skilled in the art from the following detailed description thereof, taken in conjunction with the drawings, in which:

FIG. 1 is a perspective view illustrating a vehicle constructed in accordance with the principles of the invention;

FIG. 2 is a top view of the vehicle of FIG. 1 illustrating the mode of operation of the apparatus of the invention;

FIG. 3 is a perspective view illustrating attachment of the control strap of FIG. 1 to the vehicle;

FIG. 4 is a perspective view illustrating an alternate embodiment of the invention; and, FIG. 5 is a perspective view illustrating a control strap constructed in accordance with the invention.

Briefly, in accordance with my invention, I provide a method for securing an individual in the seat of a vehicle, the seat including an upstanding backing and a horizontally oriented support member having a rear portion and a front portion. The method includes the steps of attaching handcuffs to the wrists of an individual's hands behind his back; attaching to the handcuffs a first pliable control strap having a first end with latching means and a second end with a manually grasped loop, the latching means attaching the strap to the handcuffs, the strap having a length in the range of sixteen to twenty-four inches; grasping the loop of the strap and walking with and behind the individual to the vehicle; grasping and pulling the free end of a second control strap from within the vehicle, the second control strap having another fixed end secured to the vehicle above and behind the seat backing, the strap normally extending downwardly over the backing toward the rear portion of the support member with the free end of the strap normally resting on the seat, the free end including latching means to attach the free end of the second control strap to the handcuffs; attaching the latching means to the handcuffs; releasing said grasp on the first strap; and, seating the individual in the vehicle on the support member with the second control strap extending from above and behind the seat downwardly over the backing to the handcuffs. The strap is sized to prevent the individual while seated in the seat from working his hands underneath his buttocks and legs to the front of the individual's body.

In another embodiment of my invention I provide a method for a police officer to secure a handcuffed individual in the seat of a vehicle to prevent the individual from working the handcuffs and his hands underneath his legs to the front of his body. The vehicle seat includes an upstanding backing and a horizontally oriented support member forward of the backing and having a rear portion and a forward portion. The method includes the steps in which the officer stands behind the individual and attaches handcuffs to the wrists of the individual's hands positioned behind the individual's back; stands the individual adjacent the vehicle and vehicle seat with the officer positioned behind and grasping the individual; while grasping the standing individual with one hand, grasps with other hand the free end of a control strap located within the vehicle, the control strap having a fixed end secured to the vehicle above and behind the backing, the strap normally extending from the fixed end downwardly over the backing to the rear portion of the support member with the free end of the strap resting on the seat, the free end including latching means to attach the free end to the handcuffs; attaches with the other hand the latching means to the handcuffs; and, seats the individual in the vehicle on the support member with the control strap extending from above and behind the seat downwardly over the backing to the handcuffs. The strap is sized to prevent the individual while seated in the seat from working his hands underneath his buttocks and legs to the front of the individual's body.

In a further embodiment of my invention, I provide apparatus for restraining a handcuffed prisoner in the seat of a vehicle. The vehicle seat includes an upstanding backing and a horizontally oriented support member forward of the backing and having a rear portion and a forward portion. The apparatus includes an elongate control strap. The strap has a fixed end attached to the vehicle above and behind the backing; and, a free end including latching means adapted to be connected to handcuffs on the hands of an individual sitting in the seat with his hands behind his back. The strap normally extends downwardly over the backing toward the rear portion of the support member with the free end resting on the seat. The strap is sized and attached to the vehicle such that an individual standing outside and next to the vehicle and said seat can bend down and with one hand grasp said free end on said seat, pull the free end from inside the vehicle, and attach the latching means to handcuffs worn behind the back by a prisoner standing adjacent the individual. When the prisoner is seated in the seat with the latching means attached to the handcuffs, the individual is prevented from working his hands forwardly away from the backing and underneath his buttocks and legs to the front of the individual's body.

Turning now to the drawings, in which the presently preferred embodiments of the invention are shown for the purpose of illustrating the practice thereof and not by way of limitation of the scope of the invention and in which like elements are indicated by corresponding reference characters throughout the several views, FIGS. 1 to 3 illustrate a vehicle constructed in accordance with the principles of the invention. The vehicle 11 includes rear window 12, horizontal panel 13 immediately beneath window 12, and a back seat including upstanding backing 14 and horizontally oriented support member 15 with a rear portion 16 extending the length of the seat parallel and adjacent backing 14. Member 15 also has a front portion 17 with a leading edge 18 which is ordinarily immediately beneath the knees of an individual sitting on member 15 and against backing 14. Strap 21 includes an upper fixed end 23 attached to panel 13 by bolt 24. Pliable strap 25 loops through rectangular opening 26 and is stitched 27 to itself. Although end 23 is fixed in position against panel 13, it can be rotated about bolt 24 in the manner indicated by arrows A and B. The free end 22 of strap 21 comprises a latch including a U-shaped member 30. A finger 31 is pivotally attached to member 30 at one end 32. The other end 33 of finger 31 is externally threaded. Portion 34 of member 30 is also externally threaded and carries knurled internally threaded member 35. In use, member 35 is threaded upwardly onto portion 34 and off of finger 31 such that finger 31 can be pivoted in the direction of arrow D. Member 30 is fit around the chain interconnecting the cuffs of a pair of handcuffs. Finger 31 is then pivoted in the direction of arrow E and member 35 is partially threaded onto end 33 as illustrated in FIG. 5. The latch comprising the free end 22 of strap 21 can therefore be operated with a single hand. In the practice of the invention it is not necessary that the latch be operable with a single hand; two hands can be utilized. It is, however, preferred that the latch be operable with a single hand. The dashed lines 21A, 22A in FIG. 1 illustrate how free end 22 of strap 21 extends to a point outside vehicle 11 when free end 22 is manually grasped and pulled out from within vehicle 11 by an individual standing adjacent vehicle 11 and adjacent the ends 38 and 39 of support member 15 and backing 14, respectively.

FIG. 5 illustrates an alternate embodiment of the invention including a free end 22 and a loop end 41. The loop end 41 is sized to receive the hand or fingers of an individual. Stitching 42 and 43 is used to form loop 41 and to secure pliable strap 40 to free end 22 in the manner indicated in FIG. 5. The length, indicated by arrows 44, is preferably in the range of twelve to twenty-four inches when the strap is utilized to control a prisoner walking in front of a police officer. When the strap of FIG. 5 is utilized as a hobble, it is approximately four feet long. When used as a hobble, loop 41 is sized to fit over the feet and around the ankles of a prisoner. Free end 22 is attached to the handcuffs, preferably to the chain interconnecting the cuffs, of a prisoner.

Utilization of the method and apparatus of the invention can be explained with reference to FIG. 2. After a police officer arrests a suspect, he stands behind the suspect in conventional fashion and handcuffs the wrists of the suspect behind the suspect's back. The officer then attaches the latch comprising the free end of strap 40 to the handcuffs on the suspect. The latch is preferably attached to the chain interconnecting the cuffs on each wrist of the suspect. The length 44 of the strap is preferably twelve to twenty-four inches. The officer puts one hand through loop 41 and walks behind the suspect as the suspect is directed to vehicle 11. Strap 40 enables the officer to more readily control the suspect. Strap 40 puts a small amount of distance between the officer and suspect and gives the officer more time to react to a sudden movement by the suspect. Further, when the officer is holding strap 40 he can quite readily kick a suspect in the back of the suspect's legs and force the suspect to the ground if he should become unruly. When the officer 50 and suspect 41 arrive at the vehicle 11, the officer stands the suspect 41 in front of him as illustrated in FIG. 2. In FIG. 2, both the officer and suspect 51 are facing forward looking in the direction of arrow F. In this position, the officer 50 is in a superior position to maintain control of the suspect. While holding onto loop 41 of strap 40 with one hand, the officer reaches into vehicle 11 with the other hand and grasps strap 25 first and pulls it outwardly from the car to slide his hand along strap 25 to free end 22. The officer can, alternatively, simply initially grasp free end 22 and lift it from the back seat. Initially grasping strap 25 intermediate ends 22 and 23 and running the hand therealong to end 22 requires the officer to bend down a lesser amount, which makes the officer less vulnerable while he reaches inside vehicle 11 to grasp free end 22. The officer pulls with one hand free end 22 from within the car to the position shown in FIG. 2. He then uses his hand to latch free end 22 onto the handcuffs of the suspect. The operation of the latching mechanism of free end 22 was earlier described. After free end 22 of strap 25 is attached to the suspect's handcuffs, the suspect is told to slide into the back seat of vehicle 11. The officer releases his grasp on loop 41 when the suspect begins to enter the back seat of vehicle 11. If desired, free end 22 of strap 40 can be removed from the suspect's handcuffs before the suspect is seated on support member 15. Once the suspect is seated with his back resting against backing 14, strap 25 extends down over backing 14 in the manner indicated in FIG. 1. Free end 22 is attached to the suspect's handcuffs. Strap 25 prevents a seated suspect from working his hands and handcuffs underneath his buttocks and legs to the front of his body. If a suspect attempts to pull his hands underneath his buttocks, he pulls strap 25 against his back and buttocks. Consequently, the strap 21 inhibits any movement of the hands of a suspect forwardly under his buttocks away from backing 14. If strap 25 is too long, then a suspect can, when free end 22 is attached to the suspect's handcuffs and the suspect is seated on member 15 and against backing 14, work his hands beneath his buttocks and legs to the front of his body. While the length of strap 25 (not including ends 22 and 23) may vary depending on the height of backing 14 and on the point at which fixed end 23 is attached to a vehicle, strap 25 is currently normally 30" to 38" long, preferably 32" to 36" long, in most vehicles. Regardless of the length of strap 25, end 25 must be attached to vehicle 11 at a point near enough to door 20 which permits end 22 to be moved from within the vehicle to be snapped onto the handcuffs of a suspect 51 who is standing adjacent vehicle 11 and is near ends 38 and 39 of the seat of the vehicle.

FIG. 4 illustrates an alternate embodiment of the invention in which fixed end 23 is positioned beneath member 15.

When, in FIG. 5, the length 44 of the strap is in the range of twelve to twenty-four inches, the strap is utilized by an officer to control a prisoner in the manner earlier described. One reason the strap of FIG. 5 gives the officer more control over a prisoner is that strap 40 and loop 41 are pliable. If loop 41 were not pliable, a prisoner normally would be able to break away more quickly. This is, for example, the reason that a prisoner is able to break the hold of an officer on the belt of a suspect. While a belt is somewhat flexible, when a prisoner twists it is difficult to maintain a grasp on the belt. In contrast, when an officer is grasping pliable loop 41, the twisting of a prisoner will normally not cause the officer to lose his grasp.

Having described my invention in such terms as to enable those skilled in the art to understand and practice it, and having identified the presently preferred embodiments thereof, I claim:

1. A method for securing an individual in the seat of a vehicle, said seat including an upstanding backing and a horizontally oriented support member having a rear portion and a front portion, said method including the steps of
    (a) attaching handcuffs to the wrists of an individual's hands behind his back;
    (b) attaching to said handcuffs a first pliable control strap having a first end with latching means and a second end with a manually grasped loop, said latching means attaching said strap to said handcuffs, said strap having a length in the range of sixteen to twenty-four inches;
    (c) grasping said loop of said strap and walking with and behind the individual to the vehicle;
    (d) grasping and pulling the free end of a second control strap from within said vehicle, said second control strap having another fixed end secured to said vehicle above and behind said backing, said strap normally extending downwardly over said rear portion of said support member with said free end of said strap normally resting on said seat, said free end including latching means to attach said free end of said second control strap to said handcuffs;
    (e) attaching said latching means to said handcuffs;
    (f) releasing said grasp on said first strap; and,
    (g) seating said individual in said vehicle on said support member with said second control strap extending from above and behind said seat downwardly over said backing to said handcuffs, said strap being sized to prevent said individual while seated in said seat from working his hands underneath his buttocks and legs to the front of the individual's body.

2. A method for a police officer to secure a handcuffed individual in the seat of a vehicle to prevent the individual from working the handcuffs and his hands underneath his legs to the front of his body, said seat including an upstanding backing and a horizontally oriented support member forward of said backing and having a rear portion and a forward portion, said method including the steps of the officer:
    (a) standing behind the individual and attaching handcuffs to the wrists of the individual's hands positioned behind the individual's back;
    (b) standing the individual adjacent the vehicle and vehicle seat with the officer positioned behind and grasping the individual;
    (c) while grasping the standing individual with one hand, grasping with the other hand the free end of a control strap located within said vehicle, said control strap having a fixed end secured to said vehicle above and behind said backing, said strap normally extending from said fixed end dowanwardly over said backing to said rear portion of said support member with said free end of said strap resting on said seat, said free end including latching means to attach said free end to said handcuffs;
    (d) attaching with said other hand said latching means to said handcuffs; and,
    (e) seating said individual in said vehicle on said support member with said control strap extending from above and behind said seat downwardly over said backing to said handcuffs, said strap being sized to prevent said individual while seated in said seat from working his hands underneath his buttocks and legs to the front of the individual's body.

3. Apparatus for restraining a handcuffed prisoner in the seat of a vehicle, said seat including an upstanding backing and a horizontally oriented support member forward of said backing and having a rear portion and a forward portion, said apparatus including an elongate control strap having (a) a fixed end attached to said vehicle above and behind said backing; and, (b) a free end including latching means adapted to be connected to handcuffs on the hands of an individual sitting in said seat with his hands behind his back;

said strap normally extending downwardly over said backing toward said rear portion of said support member with said free end resting on said seat;

said strap being sized and attached to said vehicle such that an individual standing outside and next to the vehicle and said seat can bend down and with one hand grasp said free end, pull said free end from within the vehicle, and attach said latching means to handcuffs worn behind the back of a prisoner standing adjacent said individual.

4. The appratus of claim 3 wherein said strap is sized such that when said prisoner is seated in said seat with said latching means attached to said handcuffs, said individual is prevented from working his hands forwardly away from said backing and underneath his buttocks and legs to the front of the individual's body.

* * * * *